United States Patent [19]
Steinmeyer et al.

[11] Patent Number: 5,884,866
[45] Date of Patent: Mar. 23, 1999

[54] SATELLITE DISPENSER

[75] Inventors: John F. Steinmeyer, Orange; Samuel Curry, Laguna Beach; James R. Richter, Westminster, all of Calif.

[73] Assignee: McDonnell Douglas Corporation, Huntington Beach, Calif.

[21] Appl. No.: 715,128

[22] Filed: Sep. 17, 1996

[51] Int. Cl.$^6$ ........................................... B64G 1/10
[52] U.S. Cl. ................................ 244/137.1; 244/158 R
[58] Field of Search ........................... 244/118.1, 137.1, 244/158 R, 161

[56]  References Cited

U.S. PATENT DOCUMENTS

| | | |
|---|---|---|
| 3,380,687 | 4/1968 | Wrench et al. . |
| 3,420,470 | 1/1969 | Meyer . |
| 3,652,042 | 3/1972 | Welther . |
| 5,052,640 | 10/1991 | Chang . |
| 5,152,482 | 10/1992 | Perkins et al. . |
| 5,393,017 | 2/1995 | Smith et al. . |
| 5,411,226 | 5/1995 | Jones et al. ........................ 244/158 R |
| 5,605,308 | 2/1997 | Quan et al. ........................ 244/158 R |
| 5,613,653 | 3/1997 | Bombled et al. .................. 244/158 R |

Primary Examiner—Galen L. Barefoot
Attorney, Agent, or Firm—Harness Dickey & Pierce P.L.C.

[57] ABSTRACT

A dispenser that is connectable to a launch vehicle in order to deploy a plurality of satellites in orbit. The dispenser includes a post having a longitudinal axis, an assembly for coupling the post to a launch vehicle, and a plurality of fittings coupled to the post and having attachment means for deployably coupling a satellite to the post. The attachment means is aligned substantially orthogonal to the longitudinal axis of the post and defines attachment bays extending annularly about the post.

14 Claims, 3 Drawing Sheets

SATELLITE DISPENSER

BACKGROUND OF THE INVENTION

1. Technical Field

The present invention relates generally to an apparatus for deploying satellites in orbit and, more particularly, to a satellite dispenser that is selectively configurable to deploy multiple satellites from a single launch vehicle.

2. Discussion

Launch vehicles used to deploy satellites in a predetermined orbit about the earth commonly include a device that couples the satellites to the launch vehicle and that is adapted to release the satellites in response to a control signal. Recent technological advancements and market forces have changed the focus of satellite deployment from payloads of a single large satellite to multiple smaller satellites. More particularly, advancements in technology relating to satellite and launch vehicle design as well as orbital deployment techniques have allowed smaller industries and companies to enter the satellite market. Global network coverage provided by an array of small satellites is coveted by the communications industry and the market of scientific payloads is increasing in commercial significance.

The increased demand for small satellite deployment has given rise to previously unaddressed concerns regarding integration of multiple satellites on a single launch vehicle as well as the continuing need to maximize the accuracy of satellite deployment. Existing deployment devices designed for a multiple satellite payload have proven to lack the desired flexibility in integrating the satellites with the launch vehicle. Rather, commonly used deployment devices accommodate a predetermined and limited number of satellites. These devices also fail to adequately accommodate the variety of sizes and weights of satellite payloads. Thus, a need exists for a multiple satellite dispenser that affords greater flexibility in the number, size, and weight of satellites which can be accommodated thereon for deployment.

SUMMARY OF THE INVENTION

The present invention provides a satellite dispenser configurable to deploy a variety of multiple satellite payloads in a simple and operationally efficient manner. The dispenser is connectable to a launch vehicle in order to deploy a plurality of satellites in orbit and includes a post having a longitudinal axis, an assembly for coupling the post to a launch vehicle, and a plurality of fittings coupled to the post and having attachment means for deployably coupling a satellite to the post. The attachment means is aligned substantially orthogonally to the longitudinal axis of the post and defines attachment bays extending annularly about the post.

BRIEF DESCRIPTION OF THE DRAWINGS

Other objects and advantages of the invention will become apparent upon reading the following detailed description and upon reference to the drawings, in which.

DETAILED DESCRIPTION

Figure 1:
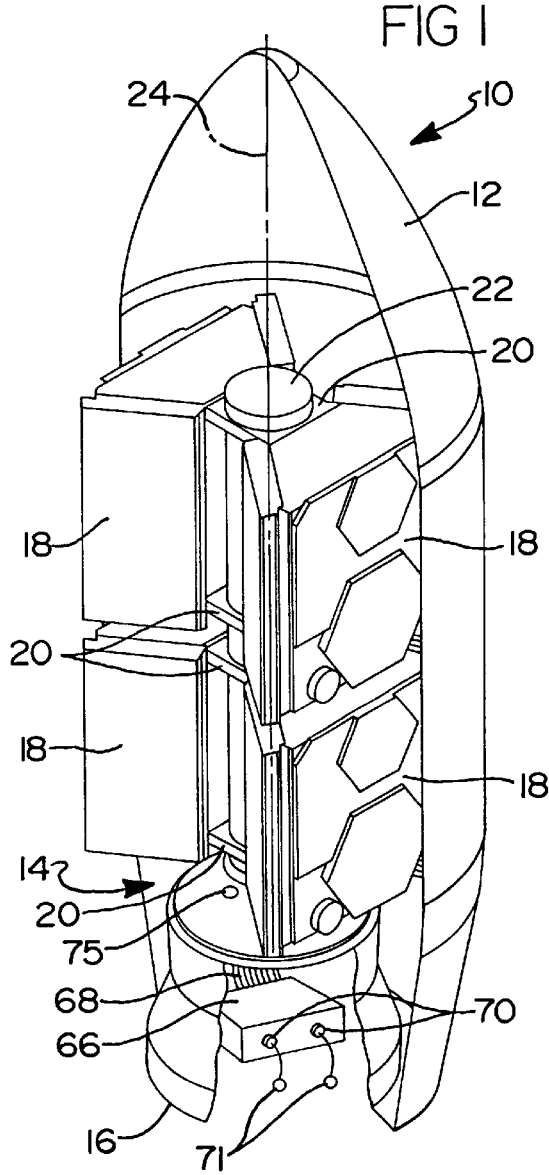
FIG. 1 is a perspective view of a plurality of satellites coupled to a satellite dispenser according to an embodiment of the present invention.

As illustrated in FIG. 1 of the drawings, a satellite deployment assembly 10 is generally shown to include a portion of a faring 12 that in its entirety surrounds a satellite dispenser 14 in a manner known in the art. In this embodiment, dispenser 14 is coupled to a portion 16 of a launch vehicle (not shown) and specifically configured to support and deploy four satellites 18 in a manner described in detail hereinafter. Those skilled in the art will appreciate from the following description that satellite dispenser 14 is configurable to support a variety of satellite payloads differing in size, number, and weight simply by coupling various shaped fittings 20 to a dispenser post 22.

Figure 2:
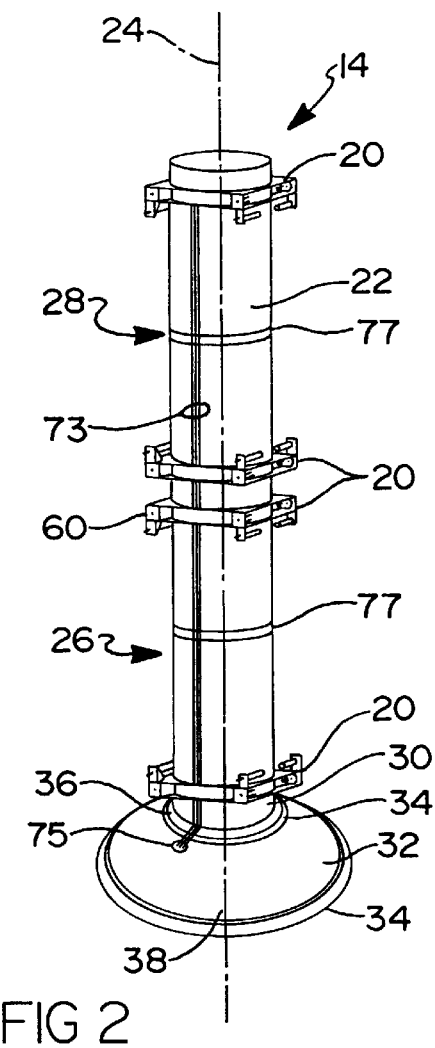
FIG. 2 is a perspective view of the dispenser illustrated in FIG. 1 with the payload and faring removed for clarity.

As illustrated in FIG. 2, post 22 preferably has a circular cross section and a longitudinal axis 24 about which fittings 20 are disposed and coupled to post 22 to extend radially therefrom and to define a plurality of satellite support bays. In the four satellite deployment configuration shown in FIG. 2, fittings 20 are disposed about the periphery of post 22 and coupled thereto, such as by an adhesive bonding or bolting, in a position defining lower satellite support bay 26 and upper satellite support bay 28. Aluminum fittings 34, preferably machined from an aluminum plate or cast, are disposed on both a forward portion 36 and an aft portion 38 of conical adaptor 32 and adhesively and mechanically bonded thereto to couple-therefor a first end 30 of post 22 to adaptor 32 and dispenser 14 to the launch vehicle portion 16, as is generally illustrated in FIG. 1.

Dispenser post 22 and fittings 20 are shown in FIGS. 1 and 2 to accommodate multiple satellites which may be deployed from a single launch vehicle. The dispenser 14 is configured to package the satellites for optimum utilization of the envelope defined by faring 12. Those skilled in the art will appreciate that while post 22, fittings 20, and adaptor 32 may be constructed of either aluminum or a composite, a composite design is preferred. More particularly, post 22 is preferably a filament wound tube with a pattern that includes zero degree, ninety degree, and ±forty five degree windings and which is specifically tailored to achieve optimum stiffness. Conical adaptor 32 is also preferably formed of a composite skin such as zero degree, ninety degree, and ±forty five degree lay up.

Figure 3:
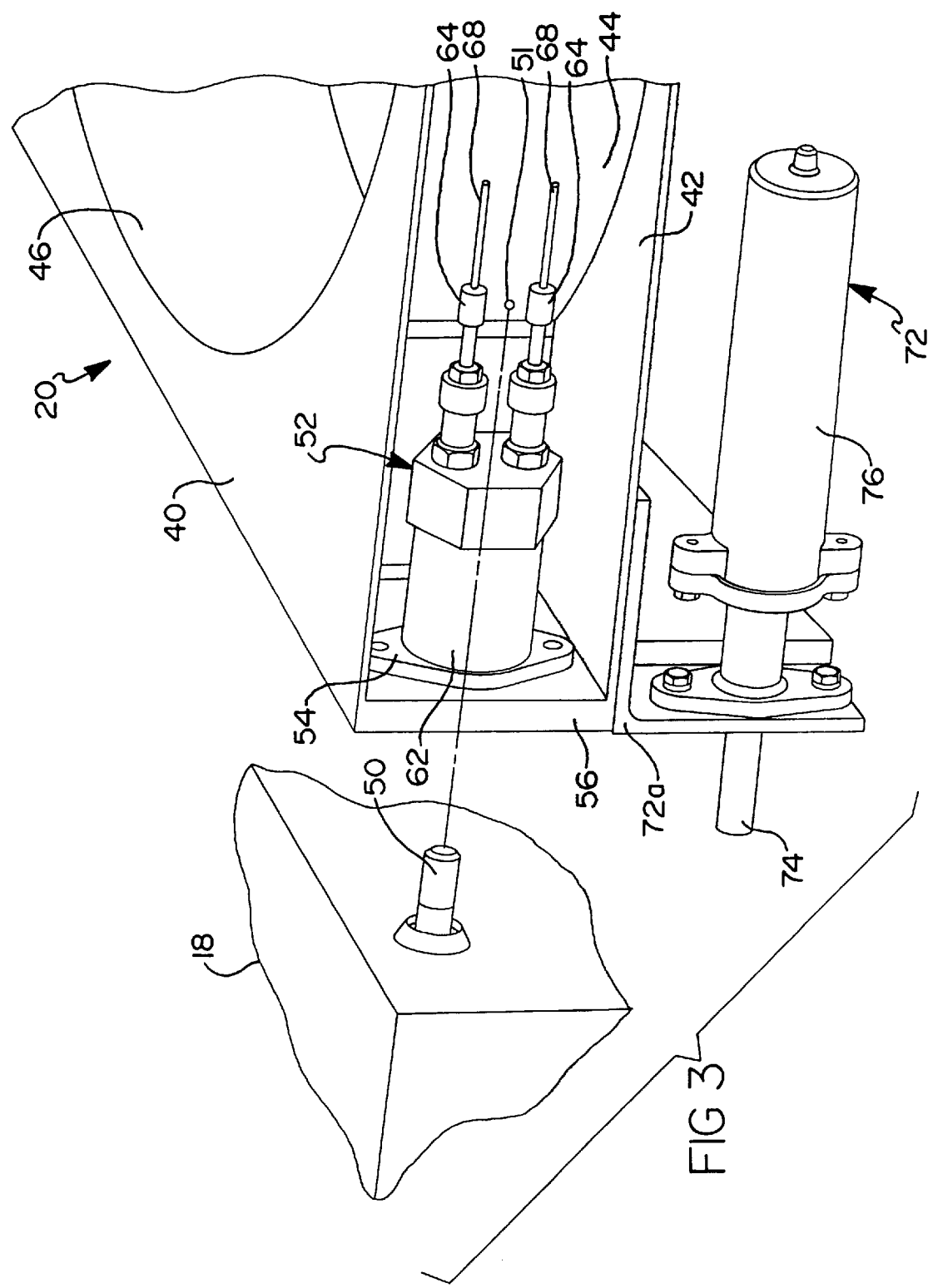
FIG. 3 is an enlarged perspective view of the dispenser fitting shown in FIG. 1 and illustrating an attachment and separation assembly of the satellite dispenser.
Figure 7:
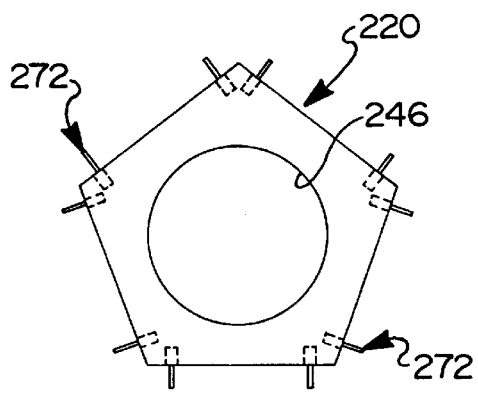
FIG. 7 is a plan view of an alternative embodiment of the attachment fitting.

The height and diameter of post 22 is selected so as to accommodate the desired number of satellites to be deployed and to adapt to a variety of launch vehicle interfaces. More particularly, as further discussed hereinafter, it is contemplated that dispenser 14 is configurable to accommodate a variety of different numbers of similarly sized satellites using differently shaped fittings 20. For example, the square shaped fittings 20 shown in FIGS. 1–3 are disposable about post 22 to accommodate two or four satellites in each of the upper and lower satellite support bays 26 and 28, respectively. The triangular shaped fittings 120 illustrated in FIGS. 4 and 5 may be used to deploy multiples of three satellites, and the pentagonal shaped fittings 220 illustrated in FIG. 7 are contemplated for use when deploying five satellites per support bay. Those skilled in the art will appreciate that other fitting geometries may be used without departing from the scope of the invention as defined by the appended claims. The configuration and spacing of the fittings and the length and cross section of post 22 can also be varied to accommodate specific satellite interface requirements as well as satellites of differing sizes and weights.

In the present invention, fittings 20 are selectively configured to secure each of the plurality of satellites 18 to post 22 through a four point bolt and separation nut attachment assembly with each fitting 20 providing two points of the four point attachment. As is illustrated in FIG. 3, each fitting 20 generally includes an upper and lower planar member 40 and 42, respectively, interconnected by a cylindrical web 44. An inner surface 46 of web 44 defines a passage configured to cooperate with post 22 such that inner surface 46 frictionally engages the outer surface of post 22. However, those skilled in the art will appreciate that various equivalent structures for securing fittings 20 to post 22 may be used without departing from the scope of the appended claims.

As most clearly illustrated in FIG. 3, each satellite 18 is shown to include a connector bolt 50 extending from a corner 48 thereof to cooperate with a separation nut assembly 52 that defines an axis 51. A connector flange 54 of separation nut assembly 52 is connectable to a fitting flange 56 interconnecting upper and lower generally planar fitting members 40 and 42, respectively. Each fitting flange 56 defines a connector bolt passage 60 (FIG. 2) configured to accommodate connector bolt 50 of satellite 18. It should be appreciated that fittings 20 are positioned about post 22 such that each of the four connector bolts extending from a selected one of satellite 18 are alignable with associated-therefor connector bolt passages defined by a pair of the respective fittings 20. Once properly aligned, satellite 18 is coupled to post 22 by urging satellite 18 along separation nut assembly axis 51 generally perpendicular to axis 24 of post 22.

Separation nut assembly 52 preferably includes a low shock separation device having a structure and operation generally known in the art. For example, a series SN9400 low shock separation nut manufactured by Hi-Scheer Technology Corp. of Torrance, Calif. may be used. Each separation nut assembly 52 generally includes a housing 62 coupled to or integral with flange 54 and connected to an initiator 64 which, as best illustrated in FIGS. 1 and 2, is operably connected to a manifold 66 by an explosive transfer assembly such as an insulated fuse 68 commonly known in the art. In the preferred embodiment, the plurality of fuses connecting manifold 66 to initiators 64 form a fuse cluster 73 passing through an aperture 75 formed in adaptor 32. Fuse cluster 73 is secured to post 22 via clamps 77.

Manifold 66 communicates with an electro-explosive device 70 that generates explosive gases in response to an electrical impulse communicated from the launch vehicle controller (not shown)along wires 71. The gases are transferred through manifold 66 to each of the plurality of fuse lines 68 connected thereto whereupon the increased temperature in manifold 66 ignites fuse lines 68. Fuse lines 68 burn from manifold 66 to initiator 64 of separation nut assemblies 52 and ignite initiator 64 to produce a gas that releases a locking device such as a piston disposed within nut housing 62.

With reference to FIG. 3, satellite 18 is propelled from fitting 20 by a separation actuator assembly 72 coupled to an angled member 72a of fitting 20. It will be appreciated that when satellite 20 is connected to post 22 at fitting 18, a piston rod 74 of actuator assembly 72 is axially displaced inwardly toward actuator assembly housing 76, thereby compressing a spring or other biasing device operably connected thereto. The force stored within the compressed biasing device within housing 76 is transferred to satellite 18 when separation nut assembly 52 releases connector bolt 50 as previously described. While the connection and deployment of satellite 18 has been described herein with reference to the single connector bolt 50, nut assembly 52, and actuator assembly 72, those skilled in the art will appreciate that similar assemblies are provided on each of the plurality of fittings 20 illustrated in FIG. 2 to provide the four point connection described herein.

As shown in FIGS. 1 and 3, satellite dispenser 14 preferably includes a pair of electro-explosive devices interconnected as previously described with a pair of initiators 64 on each separation nut assembly 52. This arrangement provides for redundant initiation of separation nut assembly 52 thereby minimizing the probability of initiation failure in response to control signals from the launch vehicle. Those skilled in the art will appreciate that while the present description and the appended drawings describe an embodiment where all of satellites 18 are deployed by a single manifold 66, additional manifolds or a valving system for regulating the flow of pressurized gas in a multi-chambered manifold may be provided so as to deploy only certain of satellites 18 in response to predetermined control signals.

Figure 4:
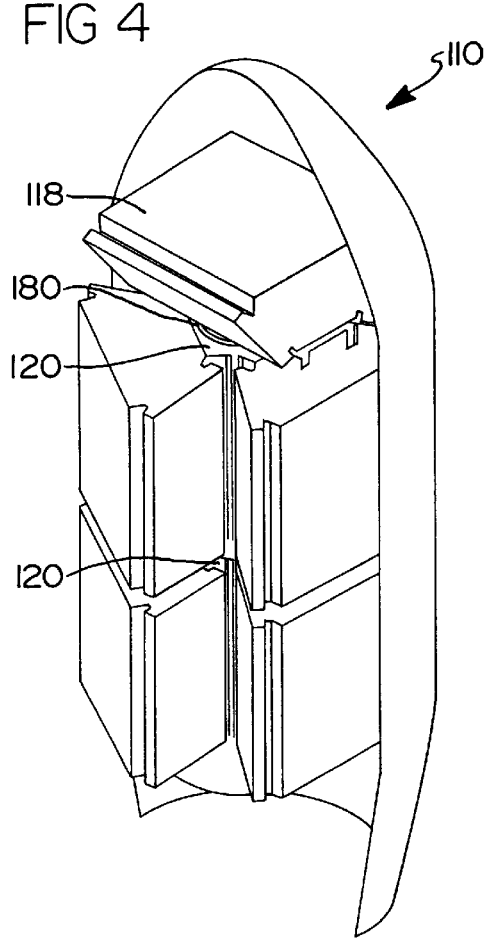
FIG. 4 is a perspective view of a plurality of satellites coupled to a satellite dispenser according to another embodiment of the present invention.
Figure 5:
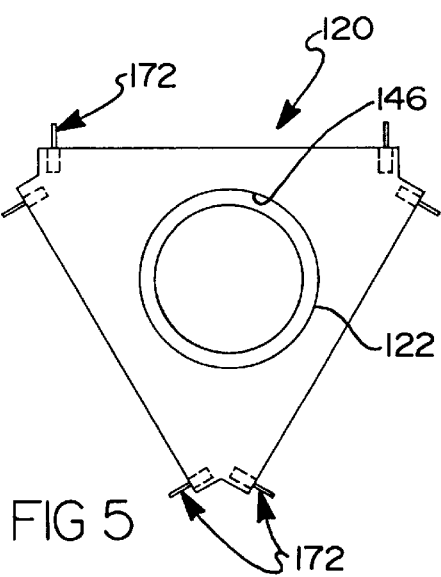
FIG. 5 is a plan view of the attachment fitting shown in FIG. 4.

FIG. 4 illustrates an alternative satellite deployment assembly 110 wherein a plurality of triangular fittings 120 are coupled to a dispenser post to define upper and lower satellite support bays as previously described. In this embodiment, each of the upper and lower support bays allow the four-point connection of three satellites for deployment. As shown in FIG. 5, the configuration of fitting 120 defines a passage 146 cooperative with post 122 and accommodates separation nut assemblies and actuator assemblies 172 of the type and in the orientation relative to the longitudinal axis of dispenser post 122 as heretofore described. More particularly, when fitting 120 is coupled to post 122, the separation nut assembly and actuator assembly 172 define an axis generally perpendicular to the longitudinal axis of post 122.

Figure 6:
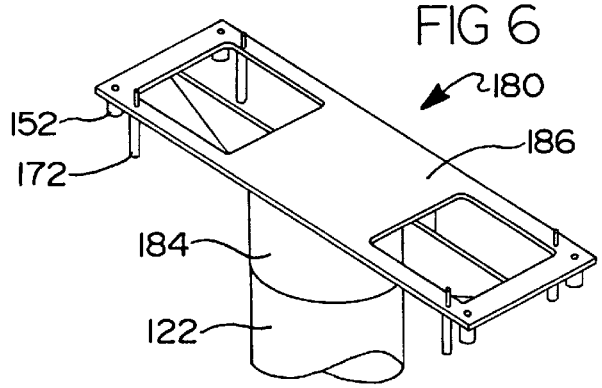
FIG. 6 is a perspective view of the axial fitting shown in FIG. 4.

FIGS. 4 and 6 illustrate that an axial fitting 180 is connectable to an upper end of post 122 thereby allowing dispenser 110 to accommodate an additional satellite 118 in the position shown in FIG. 4. Axial fitting 180 generally includes a cylinder 184 configured for bolted or adhesive attachment to post 122 and a four place separation nut and actuator assembly similar in design and configuration to that previously described. For example, FIG. 6 illustrates that a preferred embodiment of axial fitting 180 includes a fitting plate 186 connected to ring 184 and supporting a plurality of separation nut assemblies 152 and actuator assemblies 172 to define an axially extending satellite support bay.

Finally, FIG. 7 illustrates that various other configurations of the deployment assembly fittings may be used to deploy a variety of satellite payloads. The variety of usable fitting geometries allows an operator to configure the satellite dispenser of the present invention to deploy a variety of satellite payloads. Specifically, FIG. 7 shows a pentagonal shaped fitting 220 defining a passage 246 cooperative with the dispenser post shown in FIGS. 1–3 and actuator. In this embodiment, a plurality of fittings 220 are securable to the post to define satellite support bays accommodating five satellites.

Various other advantages of the present invention will become apparent to those skilled in the art after having the benefit of studying the foregoing text and the appended drawings, taken in construction with the following claims:

What is claimed is:

1. An apparatus for deploying a plurality of satellites, said apparatus comprising:
   a post having a longitudinal axis;
   a connection assembly for coupling said post to a launch vehicle; and
   a plurality of fittings selectively securable to said post along said post, each of said fittings having at least one attachment system for deployably coupling a satellite to said post, and each said attachment system having a separation assembly for releasably coupling with a portion of an associated satellite.

2. The dispenser of claim 1 further including initiator means coupled to said attachment means for releasing the satellite from said attachment means and urging the satellite therefrom in response to a signal.

3. The apparatus of claim 1 wherein said separation assembly includes a manifold, an electronically ignited explosive device coupled to said manifold, and a fuse coupled to said manifold.

4. An apparatus for deploying a satellite, said apparatus comprising:
   a post having a longitudinal axis;
   a mounting assembly for coupling said post to a launch vehicle;
   a first fitting coupled to said post;
   a second fitting coupled to said post, said first and second fittings being adjustably positionable independently of one another and each including an attachment system for deployably coupling a satellite to said post, said attachment system being aligned along an axis substantially orthogonal to said longitudinal axis of said post; and
   a satellite having a plurality of connecting members extending therefrom, said members being releasably coupled to said first and second fittings to support said satellite adjacent said post, and wherein each of said plurality of connecting members disengage said attachment system in response to a signal supplied to said attachment system to deploy said satellite.

5. The satellite dispensing apparatus of claim 4 wherein said first and second fittings each include a first member having a generally triangular configuration to define at least three attachment bays at which satellites may be mounted.

6. The apparatus of claim 4 wherein said first and second fittings each include a first member having a generally rectangular configuration extending generally orthogonally from said post for supporting said attachment system.

7. The satellite dispensing apparatus of claim 4 wherein said first and second fittings each include a first member having a generally pentagonal configuration to define at least five attachment bays at which satellites may be mounted.

8. A satellite deployment system for controllably deploying a plurality of satellites from a launch vehicle at one or more designated times during a launch trajectory of said launch vehicle, said satellite deployment system comprising:
   an elongated post;
   a member for fixedly mounting one end of said elongated post to said launch vehicle;
   a plurality of fittings adjustably securable along said post to define a plurality of pairs of attachment bays each having an area sufficient to accommodate a corresponding satellite thereat adjacent said elongated post; each of said fittings including:
      a member having an opening dimensioned to receive said elongated post and adapted to be positioned over said elongated post and fixedly secured thereto at a desired position along said elongated post;
      a separation system for releasably coupling to a portion of an associated satellite disposed adjacent one of said attachment bays to support said associated satellite adjacent said post, and to permit said satellite to be released from said fitting upon receipt of a deployment signal;
      an initiator system for forcibly acting on said associated satellite when said associated satellite is released by said separation system to forcibly urge said associated satellite away from its said attachment bay when said separation system is activated; and
   a system for generating a plurality of deployment signals to said separation systems to cause each of said satellites supported by said fittings to be deployed at a desired time during said launch trajectory of said launch vehicle.

9. The system of claim 8, wherein each said fitting comprises a pair of said separation systems.

10. The system of claim 8, wherein each said fitting comprises two pairs of said separation systems arranged such that said pairs project approximately 180 degrees away from each other.

11. The system of claim 8, wherein each said fitting comprises a plurality of pairs of separation systems.

12. The system of claim 11, wherein each said fitting comprises at least one planar member having a flange, said flange being adapted to support said separation system such that said separation system extends generally orthogonally from said post.

13. The system of claim 11, wherein each said fitting comprises at least a pair of generally parallel, planar members having a flange formed therebetween, said flange being adapted to support said separation system such that said separation system extends generally orthogonally from said post.

14. A satellite deployment system for controllably deploying a plurality of satellites from a launch vehicle at one or more designated times during a launch trajectory of said launch vehicle, said satellite deployment system comprising:
   an elongated post;
   a member for fixedly mounting one end of said elongated post to said launch vehicle;
   a plurality of pairs of fittings moveable independently of one another and adjustably securably along said post to define a plurality of pairs of attachment bays, each said attachment bay having an area sufficient for supporting a corresponding satellite thereat adjacent said elongated post;
   each of said fittings including:
      a member having an opening dimensioned to receive said elongated post and adapted to be positioned over said elongated post and fixedly secured thereto at a desired position along said elongated post;
      a separation system for releasably coupling to a portion of an associated satellite disposed adjacent one of said attachment bays and for releasably supporting said associated satellite adjacent said post;
      an initiator system for forcibly acting on said associated satellite when said associated satellite is released by said separation system to forcibly urge said associated satellite away from its said attachment bay when said separation system is activated; and
   a system for controlling activation of each of said separation system to cause each of said satellites supported by said fittings to be deployed at a desired time during said launch trajectory of said launch vehicle.

* * * * *